United States Patent [19]
Hsu

[11] Patent Number: 6,076,453
[45] Date of Patent: Jun. 20, 2000

[54] MULTIPURPOSE ROASTER

[75] Inventor: Tony Hsu, Yung Kang, Taiwan

[73] Assignee: Lundar Electric Industrial Co., Ltd., Tainan Hsien, Taiwan

[21] Appl. No.: 09/368,492

[22] Filed: Aug. 5, 1999

[51] Int. Cl.[7] .............................. A47J 37/00; A47J 37/04

[52] U.S. Cl. ......................... 99/421 H; 99/419; 99/427; 99/448

[58] Field of Search .................. 99/339, 340, 352–355, 99/400, 401, 419–421 V, 446–450, 467, 473–476, 481, 482, 516, 534–536, 426, 427; 126/25 R, 9 R, 41 R, 9 B, 27; 219/400, 401, 753, 752

[56] References Cited

U.S. PATENT DOCUMENTS

| | | | |
|---|---|---|---|
| 3,848,522 | 11/1974 | Trelc | 99/340 X |
| 4,409,452 | 10/1983 | Oouchi et al. | 99/421 H |
| 4,770,091 | 9/1988 | Vaughn | 126/9 R |
| 4,810,856 | 3/1989 | Jovanovic | 219/401 |
| 5,832,811 | 11/1998 | King | 99/419 X |

*Primary Examiner*—Timothy Simone
*Attorney, Agent, or Firm*—Rosenberg, Klein & Lee

[57] ABSTRACT

A multipurpose roaster is mainly composed of a frame, fixtures and a skewer, wherein two side board have a slanting sliding guide from up gradually decent with a recess and a seat at the bottom end of the sliding guide, the fixture has a hole and a bolt for a skewer to insert there through and secured by bolt thereat, or to accommodate a grid cage or a pan thereto, and slide along the sliding guide into the roaster.

8 Claims, 15 Drawing Sheets

MULTIPURPOSE ROASTER

BACKGROUND OF THE INVENTION

1. Field of the Invention

This invention relates to a multipurpose roaster, and more particularly, to a roaster driven by a motor to spin the grid to a various food.

2. Prior Art

The conventional roaster, as shown in FIG. 13, has a square skewer 94 and two fixtures 95. The square skewer 94 has one sharp engaging end 941 and a round engaging end 942. Each of the fixtures 95 has a bolt 951 and extending two forks 952 from respective ends thereof In practice, as shown in FIG. 14, the square skewer 94 is slipping through a meat 9 and is holding it firmly thereon with the two forks 952 of the fixtures 95 also slipping into the meat 9, and the skewer 94 is secured by bolts 951 to the fixtures 95, respectively. The sharp engaging end 941 of the square skewer 94 is engaged with a motor 96 and is driven by the motor 96 through a connector 961, whereas the round engaging end 942 is also secured to the roaster.

Another prior art, as shown in FIG. 15, is also comprised a pair of round skewers 97 and a set of pans 98 and 99. One end of each round skewer 97 has a sharp point used to be easy slipped into and hold food, while the other end has a threaded portion 971. The pan 98 includes an engaging outer end 981 and two posts 982 at the inner end. Each post 982 has a threaded hole 983. The pan 99 has an engaging outer end 991 and two posts 992 with a hole 993 therein. The sharp ends of the round skewers 97 are inserted into the holes 993 of the posts 992 of the pan 99. The threaded ends 971 of the skewers 97 are connected with the threaded holes 983 of the two posts 982 of the pan 98.

The prior art shown in the above, can only grill a whole chicken or a meat and is not able to use with other accessories, such as pan or grill cage, the meat or chicken will have to be placed in with caution.

In view of this, the inventor has invented the present invention which is designed to be used with different accessories for various purposes.

SUMMARY OF THE INVENTION

It is the primary object of the present invention to provide a multipurpose roaster which is composed of a frame, fixtures and a skewer. Wherein the side boards of the frame have a slanting sliding guide from up gradually decent with a recess and a seat at the bottom end of each sliding guide. The fixture has a hole and a bolt for a skewer to insert there through and secured by the bolt thereat, or to accommodate a grid cage or a pan thereto, and slide along the sliding guide into the roaster.

DETAILED DESCRIPTION OF THE PREFERRED EMBODIMENTS

The present invention relates to a multipurpose roaster which is composed of a frame 1, fixtures 2 and 2A and a skewer 3.

Figure 2:
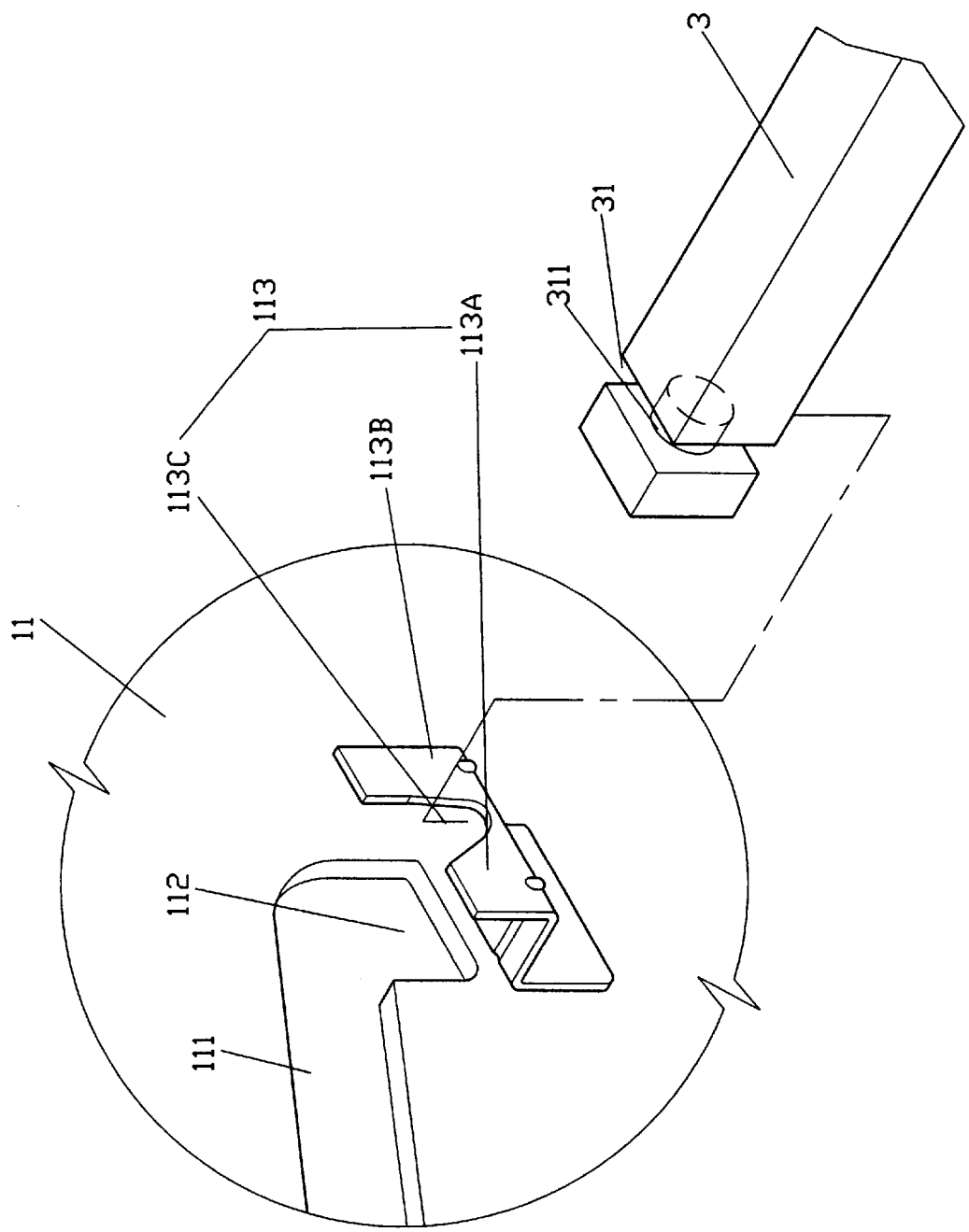
FIG. 2 is an enlarged view of a guide rail and one end of a skewer of the present invention.

Each of the two side boards 11 of the frame 1 has a corresponding sliding guide 111, as shown in FIG. 2. A recess 112 at the end of the sliding guide 111 and a seat 113 at the bottom end. The seat 113 is formed by a short lug 113A, a long lug 113B, and a trough 113C. The short lug 113A is connected with its peak to the sliding guide 111, and the trough 113C is so designed that corresponding to the recess 112.

Figure 1:
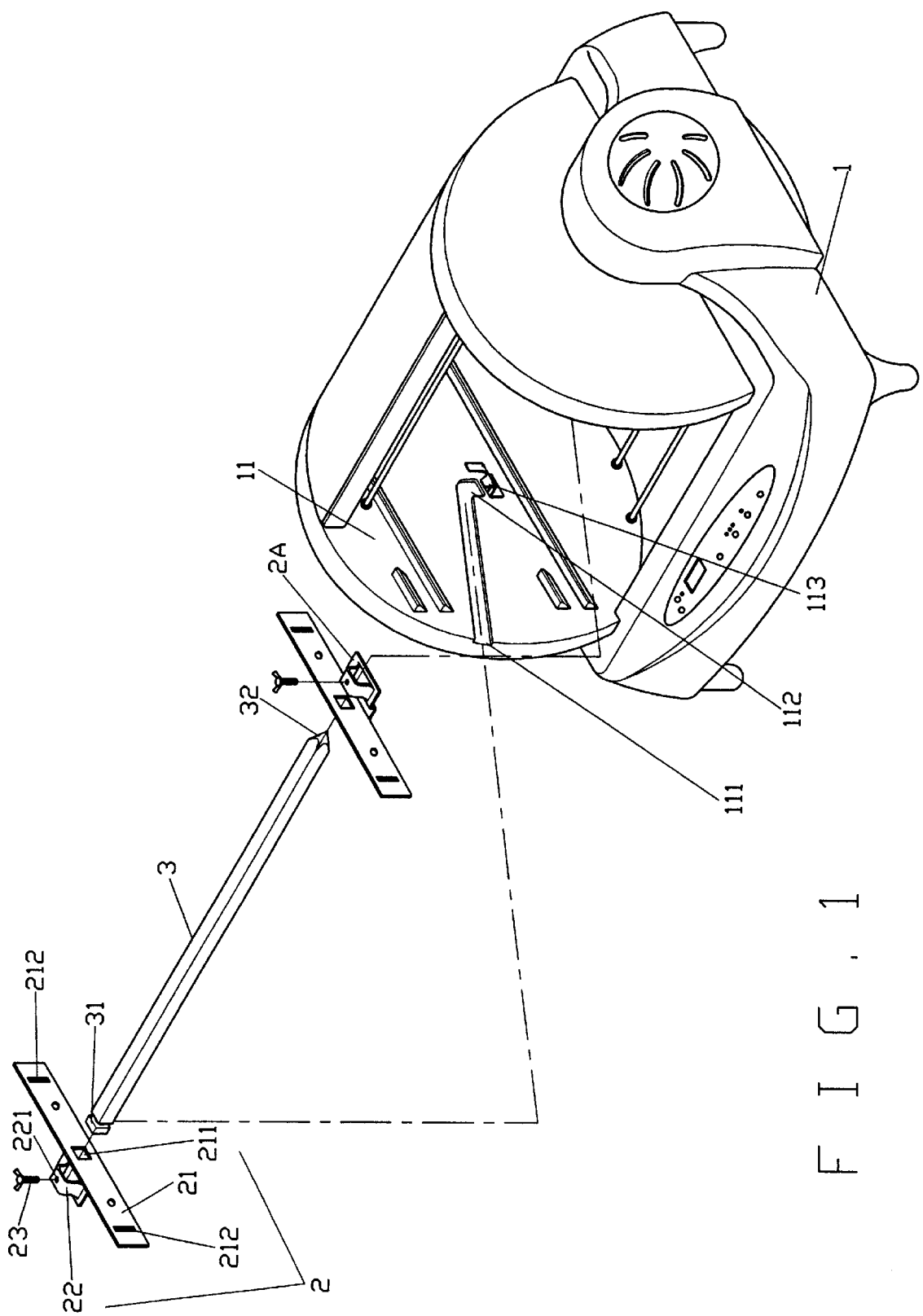
FIG. 1 is a perspective view of the roaster of the present invention.

The fixture 2 or 2A (since it is identical to the fixture 2A, only one will be described, hereinafter), as shown in FIG. 1, comprises a runner 21, a latch 22 at one side of the center portion of the runner 21, and wing a bolt 23. The runner 21 has a hole 211 at its center and two slots 212 at respective ends. The latch 22 has a threaded hole 221 for the bolt 23 to insert and secure thereat.

The skewer 3 has a ditch 31 at one end, and a connecting end 32 at the other end to stick food onto the skewer 3 which is driven by a motor (not shown). As shown in FIG. 2, because the skewer 3 is not in a round shape in cross section in order to prevent food from spinning thereon and the skewer 3 is required to spin itself, is to seat in the trough 113C, the reduced circular portion 311 of the ditch 31 facilitates the rotation of the skewer 3. It is to be noticed, that the cross section of the skewer 3 is not limited to a square shape, and may be in any shape other than round.

The skewer 3 is inserted through the hole 211 of the fixture 2 or 2A and then secured by the bolt 23 thereat, thus place the skewer 3 into the sliding guide 111 with the endmost seating in the recess 112, the connecting end 32 and the motor are connected at this moment.

Figure 3:
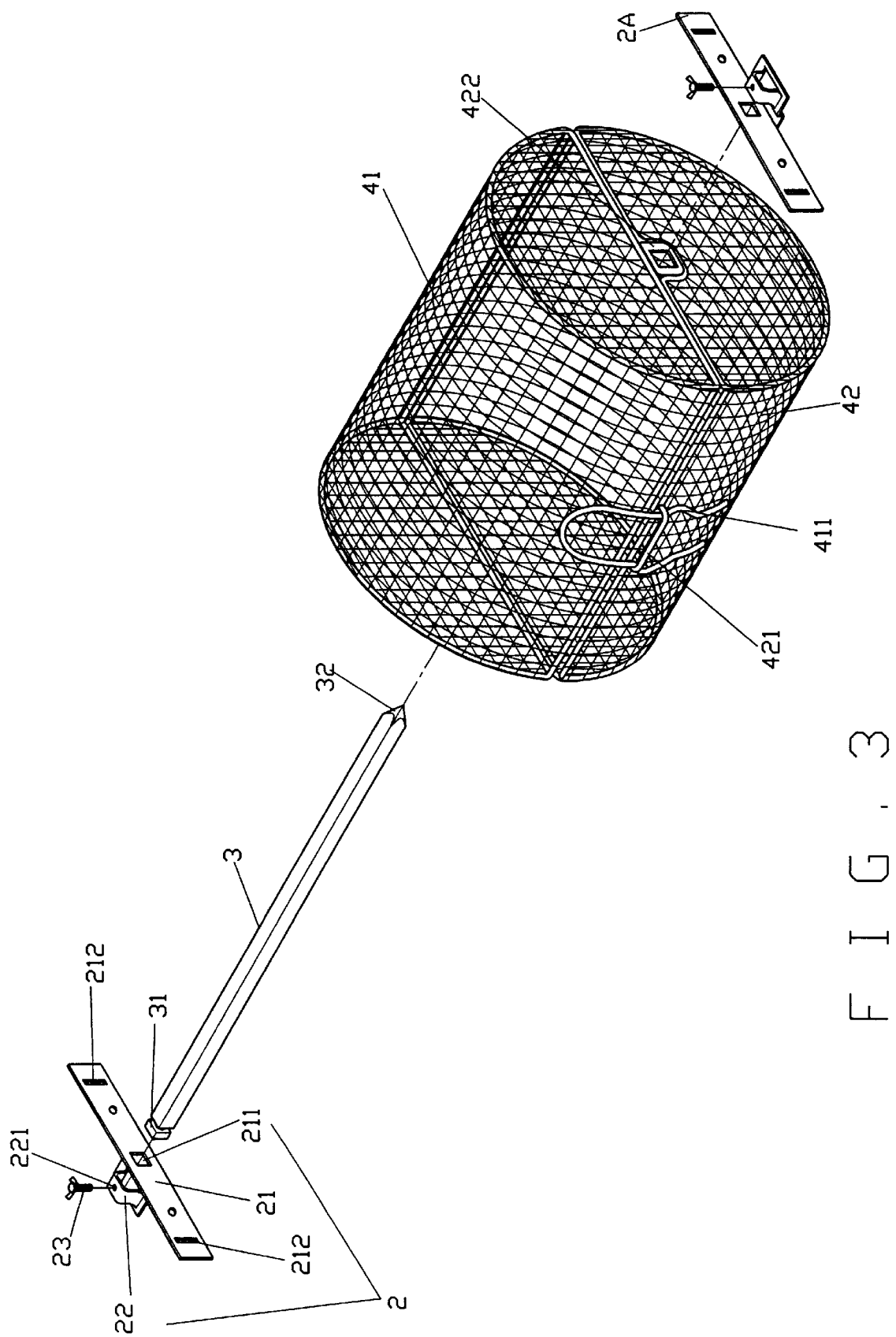
FIG. 3 is an exploded view of a grid cage roaster of the present invention.

A grid cage 4 of the present invention, as shown in FIG. 3, is composed of a frame 1, fixtures 2 and 2A and the grid cage 4 which is formed by a pair of semi-circular grids 41 and 42. The semi-circular grid 41 has a latch 411 at one side which corresponds to a latch ring 421 of the other semi-circular grid 42 which also comprises a hole 422 at respective end. Thus, when the two semi-circular grids 41 and 42 are connected together, the latch 411 will be snapped with the latch ring 421 to connect the two grids 41 and 42 together and forming the cage 4. The grid cage 4 is able to accommodate small pieces of food, such as potatoes, by inserting the skewer 3 through the hole 422 of the grid cage 4 and the hole 211 of the fixture 2 or 2A and secured by the bolt 23.

Figure 4:
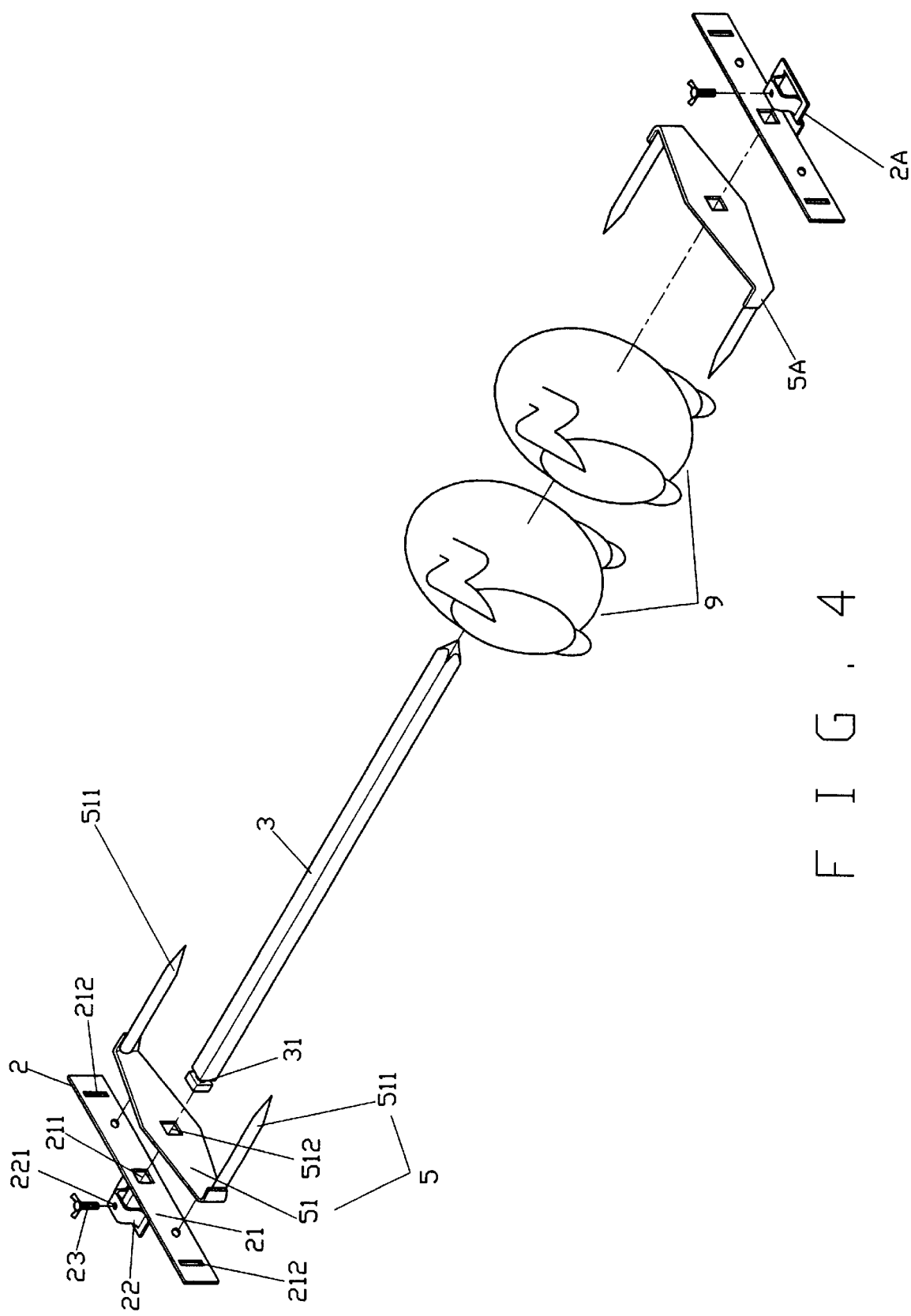
FIG. 4 is an exploded view of a chicken roaster of the present invention.

The fork set for chicken roast, as shown in FIG. 4 is composed of the frame 1, the fixture 2 or 2a, the skewer 3, and fork sets 5 and 5A(since the fork set 5 and 5A are identical, only one set will be described, hereinafter). The fork set 5 is a flat piece with forks 511 protruding from respective ends, a hole 512 at its center portion for insertion of the skewer 3 there through. The skewer 3 is then slipping through a meat 9 and is holding it firmly thereon with the forks 511 of the fork set 5 and SA also slipping into the meat 9, and the skewer 3 is secured by the bolt 23, and placed in the sliding guide 111, as described above.

Figure 5:
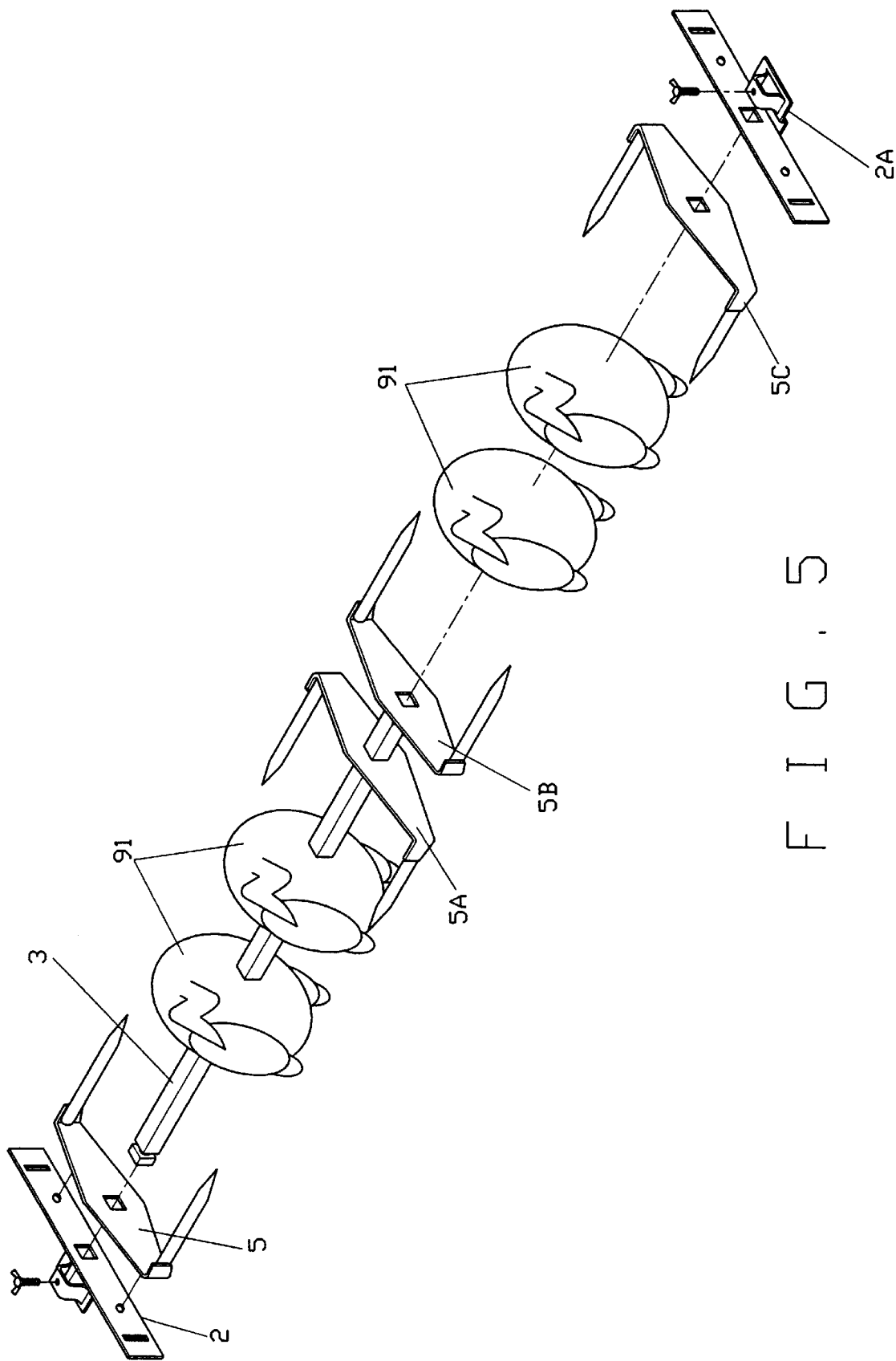
FIG. 5 is a second embodiment of a chicken roaster of the present invention.
Figure 6:
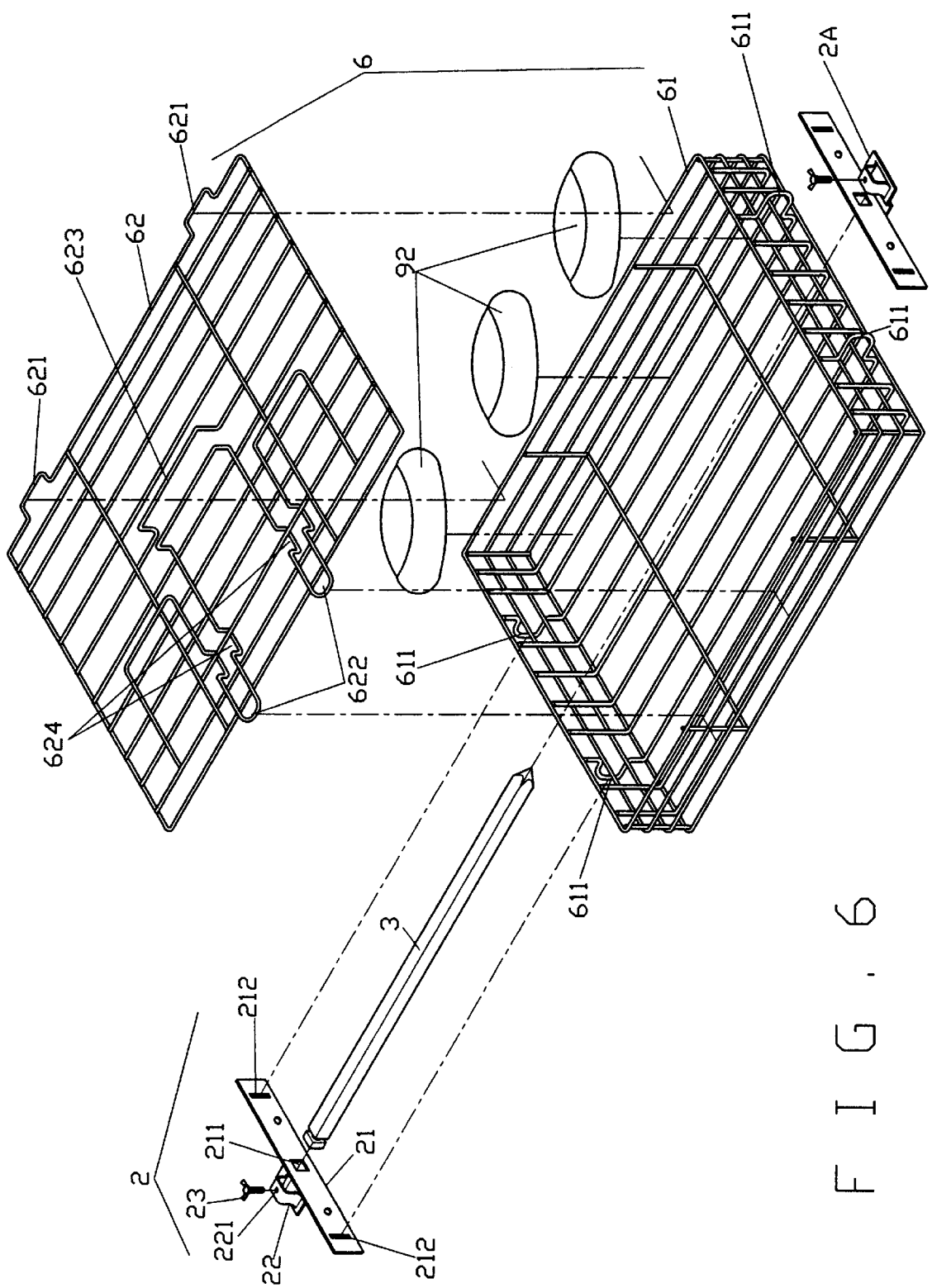
FIG. 6 is a perspective view of a roaster of the present invention with a basket.

FIG. 5 shows an extra of a pair of fork sets 5B and 5C for small pieces of chick(91), the rest are identical to the above.

Figure 7:
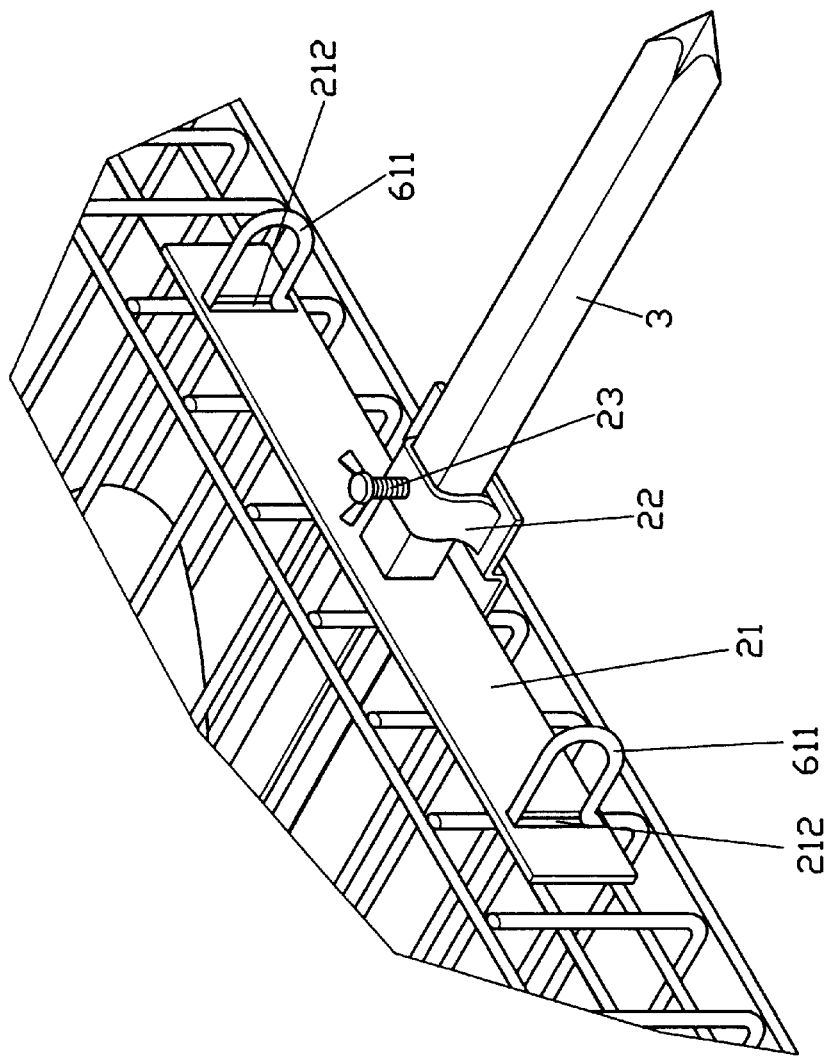
FIG. 7 is a perspective view of the basket of the present invention.
Figure 8:
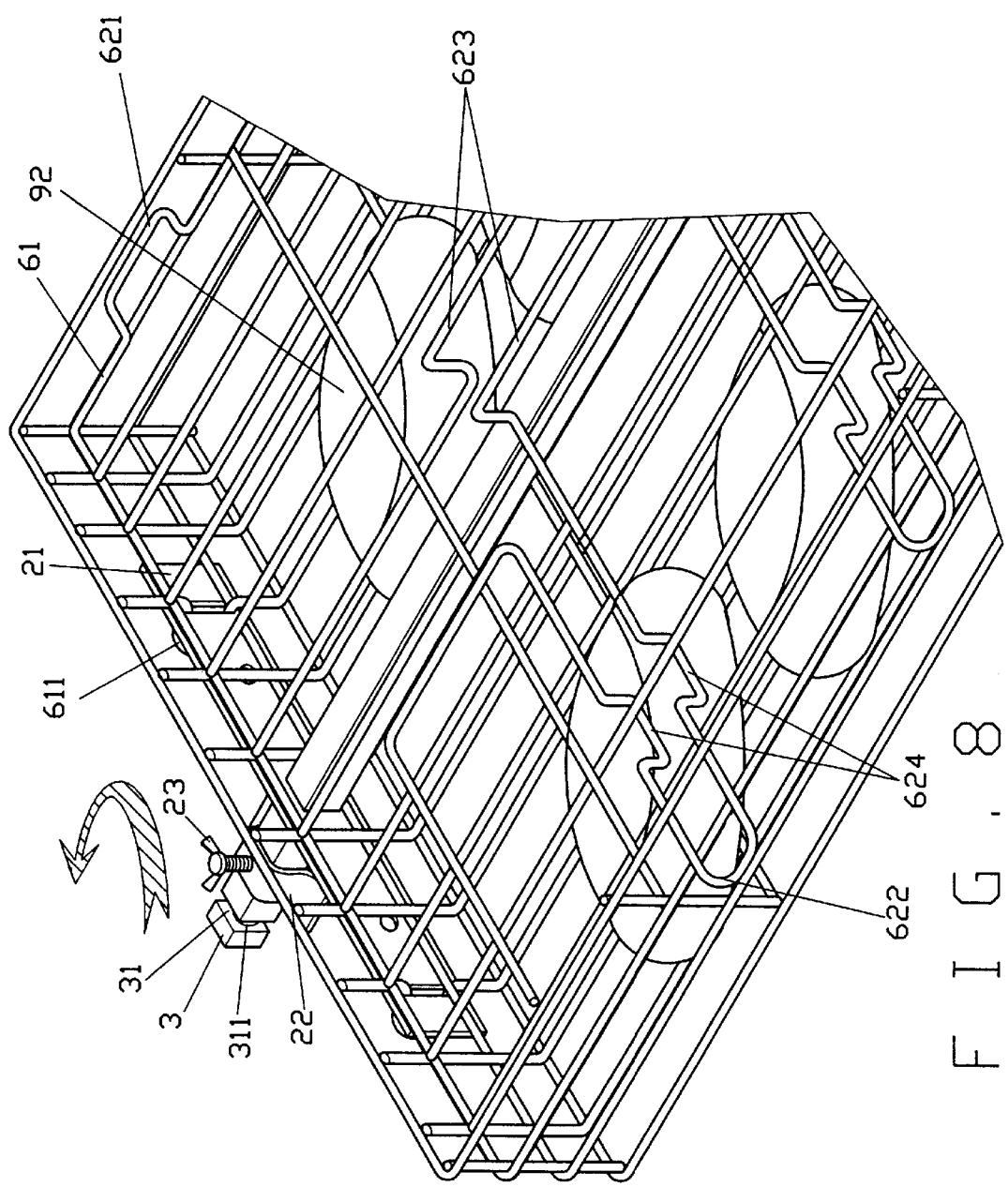
FIG. 8 is another perspective view of the basket of the present invention.
Figure 9:
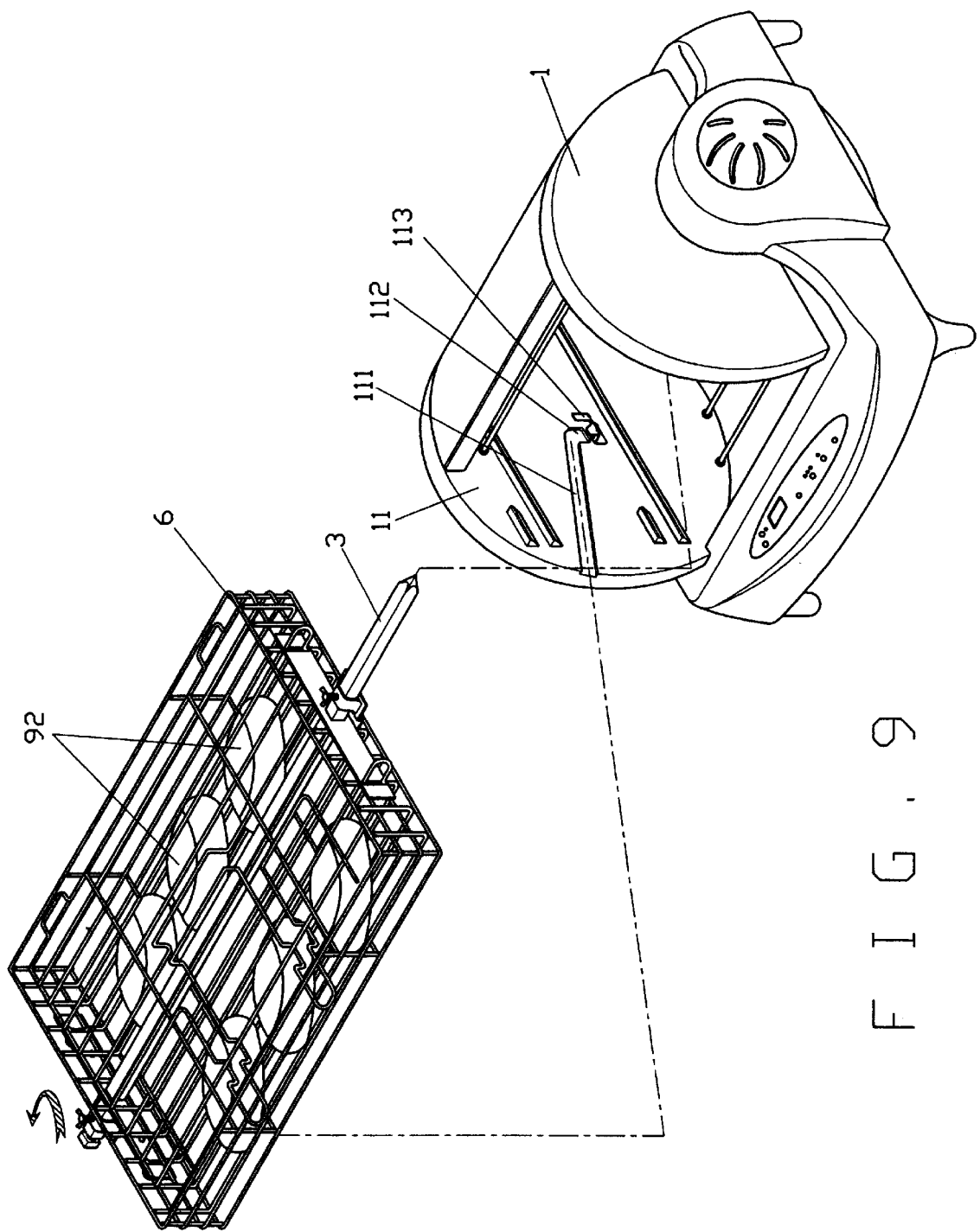
FIG. 9 is a perspective view showing the basket placed into the roaster of the present invention.

FIGS. 6 through 9 are showing bread basket of the present invention which is replaced the grid cage 4 to a flat basket 6 for bread 92. This basket 6 has a square shape frame 61 and a cover 62. The frame 61 comprises a pair of rings 611 bulging out from respective sides and corresponds to the slot 212 of the runner 21 of the fixture 2 or 2A, as shown in FIG. 7. The cover 62 has also two rings 621 and 622 bulging out from respective sides and is in correspondence with the bottom end of the frame 61 for insertion purpose, as shown in FIG. 8. Another two rings 623 and 624 are also bulging out from the cover 62 towards upper and lower directions. The ring 624 will be engaged with the bottom portion of the frame 61 while the cover 62 is secured to the frame 61, while the ring 623 is designed for users to hold the basket 6 easily. FIGS. 7 and 8 are depicted that the ring 611 of the basket 6 is inserted into the slot 212 of the runner 21. The skewer 3 is inserted through the hole 211 of the fixture 2 or 2A and secured by the bolt 23, they may be placed in the sliding guide 111 as shown in FIG. 9.

Figure 10:
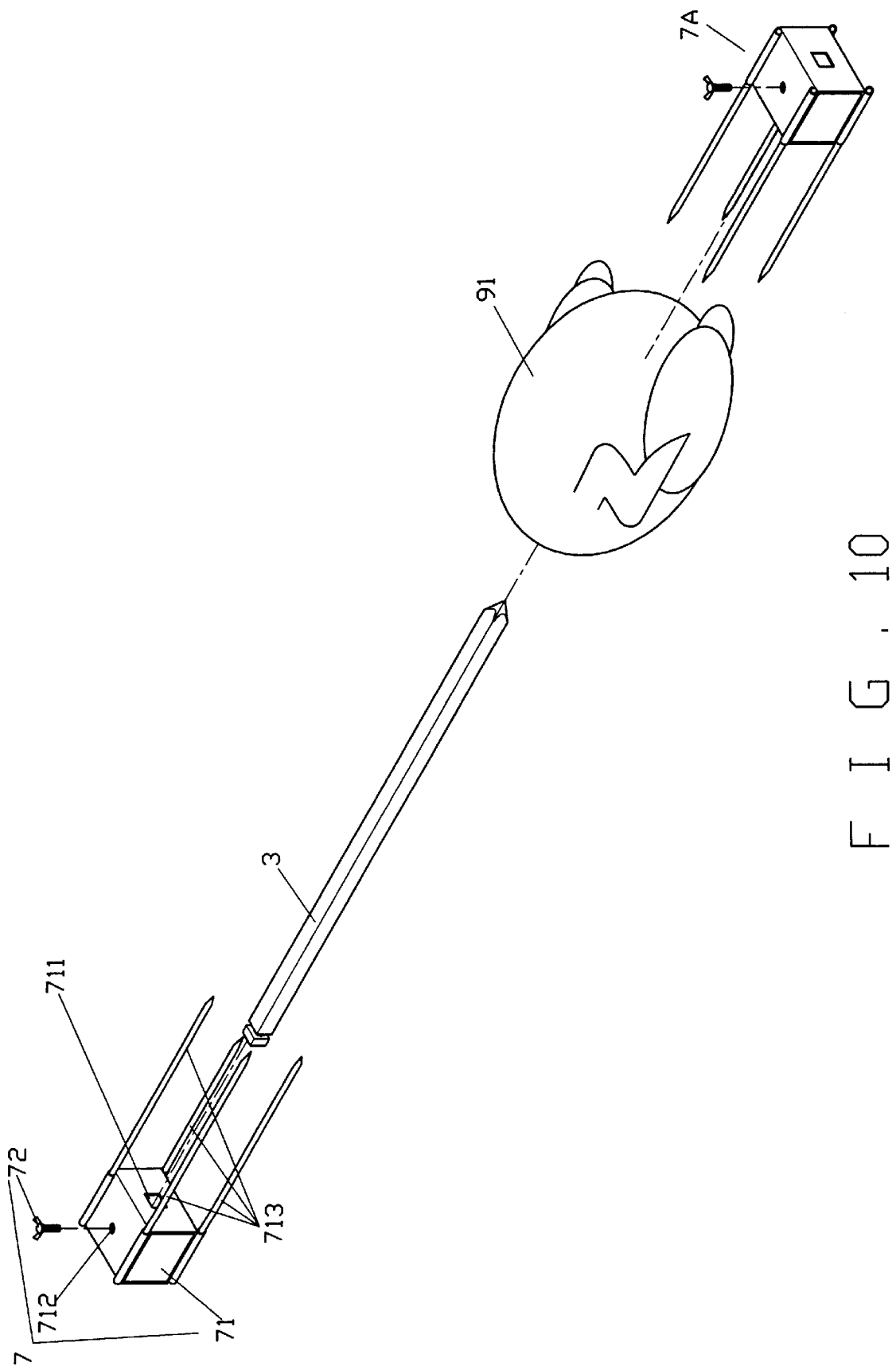
FIG. 10 is a second embodiment of a skewer of the present invention.
Figure 11:
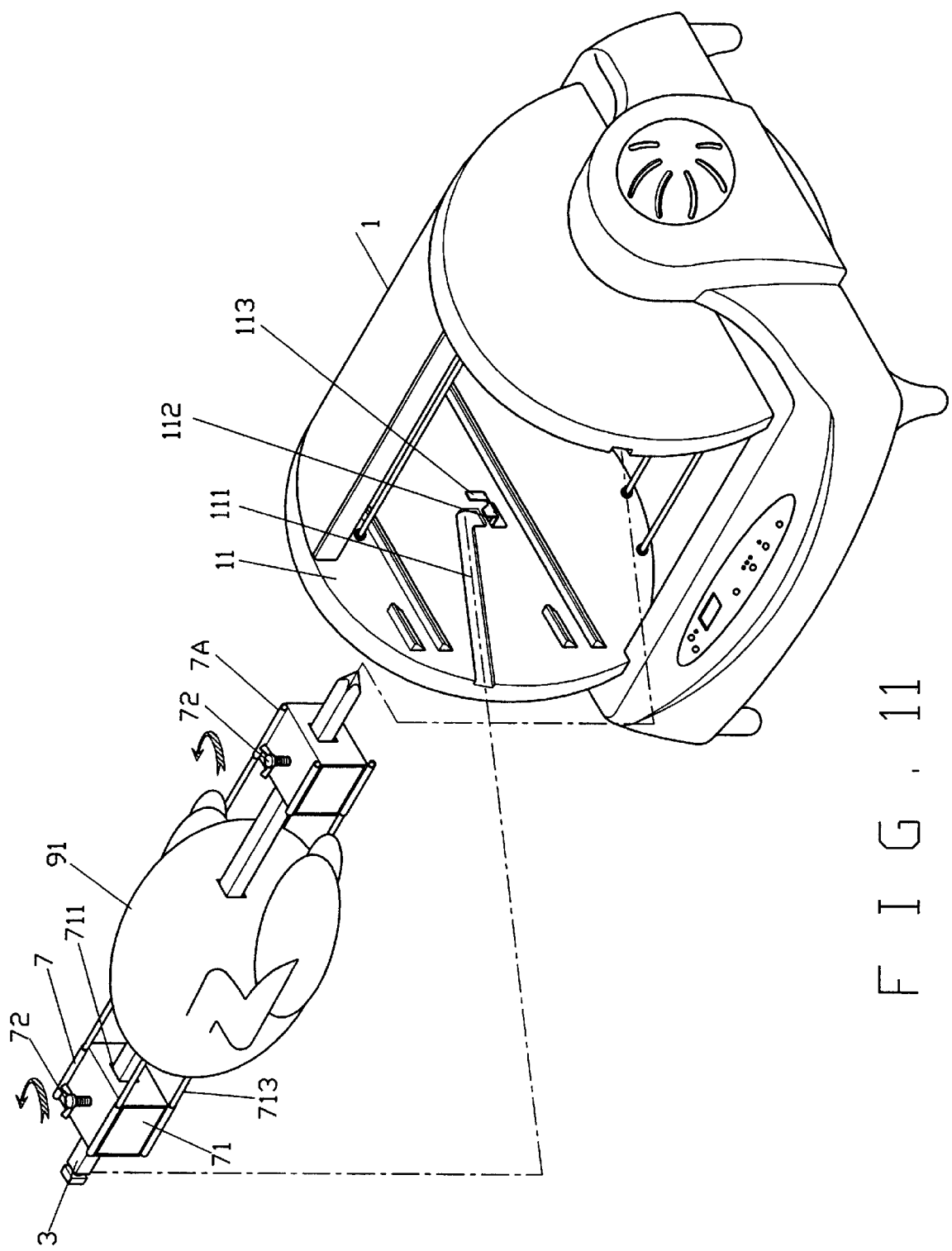
FIG. 11 is showing a roaster to accommodate the skewer of FIG. 10.

FIG. 10 is showing another embodiment of a chicken roast which as shown in FIGS. 4 and 5, is combined the fixture 2 or 2A with the fork set 5 or 5A to form a new designed fork set 7 or 7A (since the fork set 7 and 7A are identical, only one will be described, hereinafter). The fork set 7 comprises a box 71 with a center hole 711 and four forks 713 extending from four corners of the box 71 towards the same direction, and a threaded hole 712 in a vertical direction with respect to the center hole 711. In practice, as shown in FIG. 11, the forks 713 of the fork set 7 or 7A are sticking into a chicken 91, and are secured by the bolt 23 later on. They also may be placed in the sliding guide 111.

Figure 12:
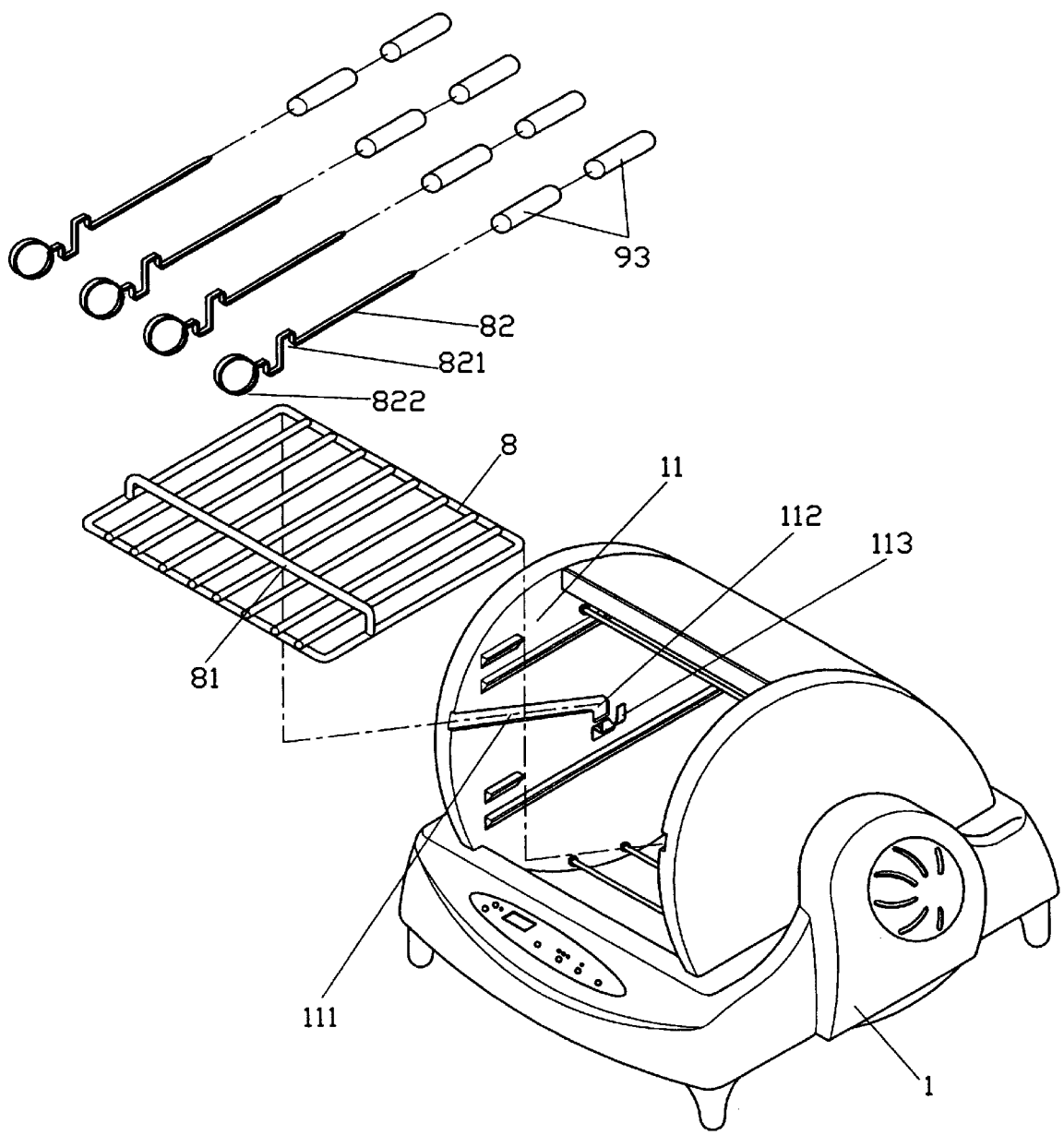
FIG. 12 is another embodiment of the present invention.
Figure 13:
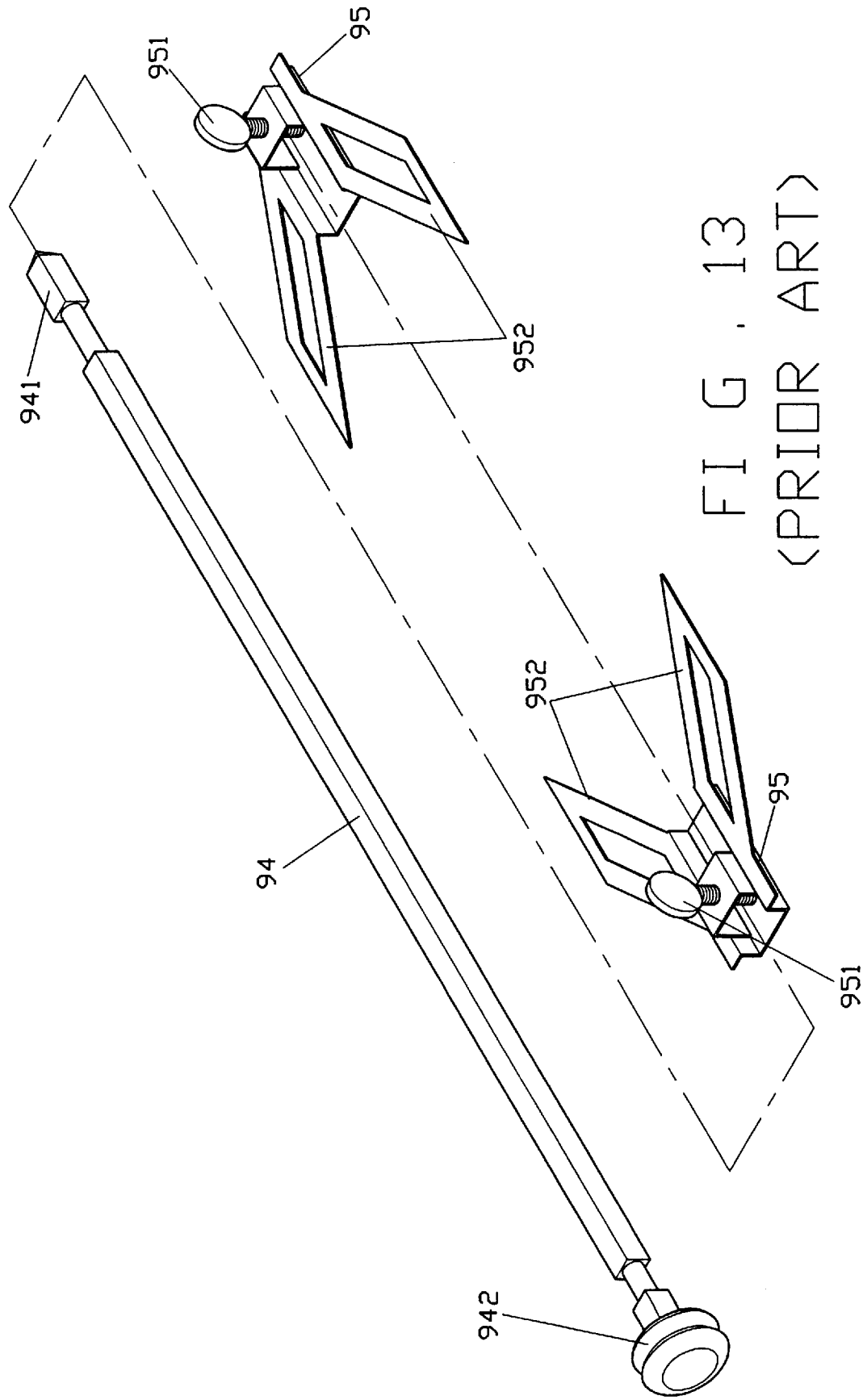
FIG. 13 is a perspective view of a prior art.
Figure 14:
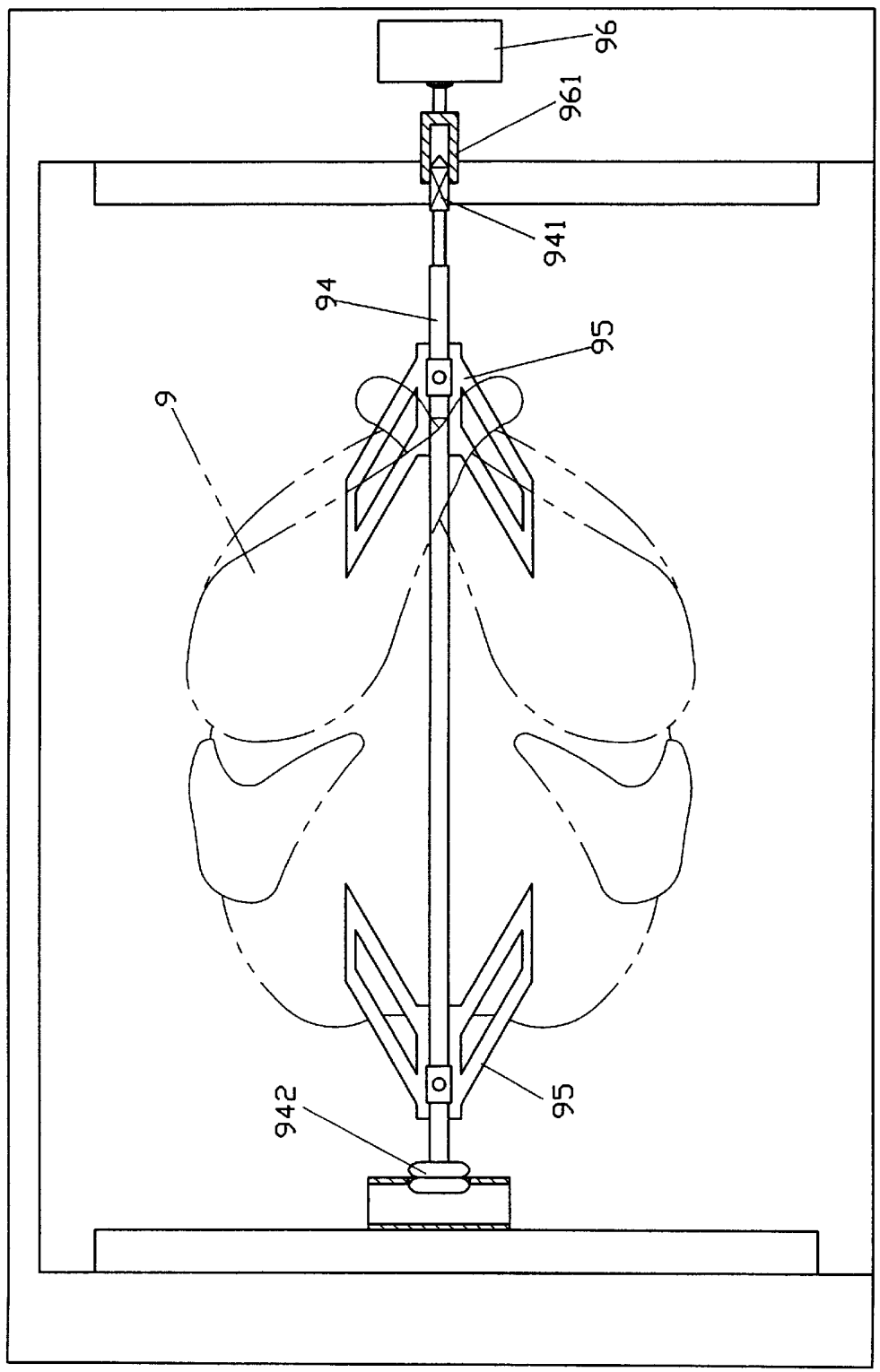
FIG. 14 is a front view showing a chicken placed into the roaster of the prior art.
Figure 15:
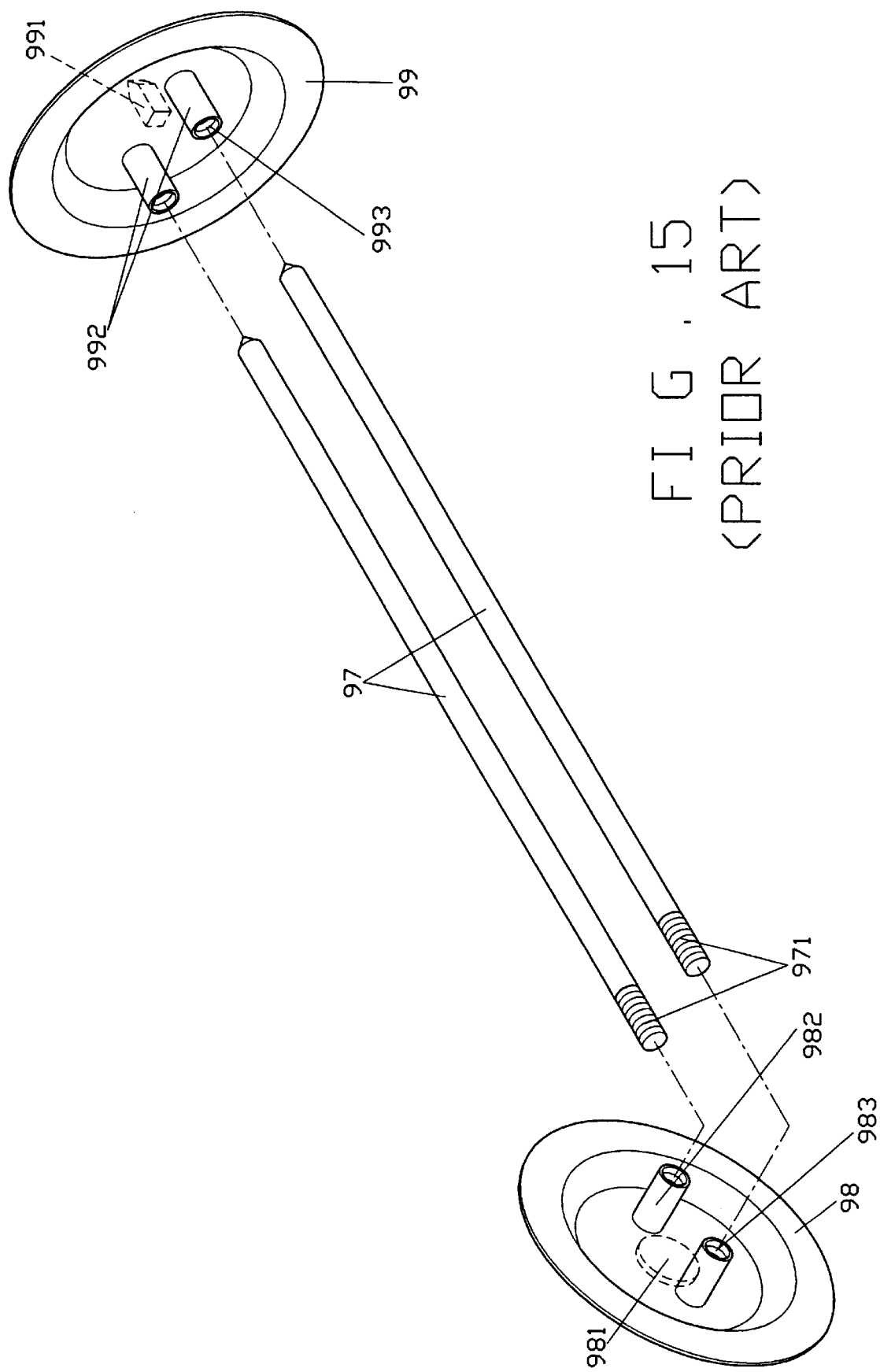
FIG. 15 is another prior art.

FIG. 12 has shown another embodiment of the present invention which utilizes a grid 8 instead of the skewer 3. The grid 8 is composed of a hanger 81 extending upwardly and several skewers 82. Each skewer 82 has a bending portion 821 for hanging on the hanger 81, the rear end of the skewer 82 is formed with a ring 822 for handling purpose.

What is claimed is:

1. A multipurpose roaster comprising a frame, fixtures and a skewer, along with a grid cage and other baking or roasting accessories, each said fixture having a hole and slots, and the improvements comprising:

said frame having a pair of sliding guides formed in respective side boards of said frame in a downward sloping direction, wherein at least one said sliding guide includes a seat at a bottom end thereof, and wherein said skewer is secured by fasteners to said fixtures and confined by a ditch formed adjacent one end of said skewer and received within a trough formed in said seat of said sliding guide to seat on said seat trough to receive said skewer therein.

2. The multipurpose roaster as recited in claim 1, wherein said seat is formed by a short lug, a long lug and said trough in between, said short lug having the peak connected to said sliding guide, and said trough being corresponding to a recess formed at an end of said sliding guide.

3. The multipurpose roaster as recited in claim 1, each said fixture being formed by a runner, a latch and a bolt, and said runner having a central hole and slots at respective ends thereof.

4. The multipurpose roaster as recited in claim 1, wherein said skewer is inserted into openings formed in a grid cage, said grid cage being formed by a pair of semicircular grids connected together, one of said semicircular grids including a latch, while the other said pair of semicircular grids includes a latch ring corresponding to said latch, said latch being clampingly engaged to said latch ring to form an enclosed cage.

5. The multipurpose roaster as recited in claim 1, wherein said skewer is used with a fork set, said fork set comprising a flat piece with a pair of forks extending from respective ends of said flat piece, said flat piece having a central hole formed therein for passage of said skewer therethrough.

6. The multipurpose roaster as recited in claim 3, wherein said skewer is used with a basket and a cover, wherein said basket comprises a pair of rings protruding outwardly from each of a pair of opposing sides of said basket and in respective correspondence with said slots of said runner of said fixtures, said cover being formed with a pair of rings extending from each of two opposing sides of the cover for coupling to said basket, said cover having a ring formed on an upper portion thereof for use as a handle, said pair of rings of each respective side of said basket being respectively passing through said slots of a respective runner for securement thereto, said skewer being inserted through said central holes of said runners.

7. The multipurpose roaster as recited in claim 1, wherein said skewer is used with a fork set, said fork set comprising a box with a central hole formed therein, a threaded hole in a direction orthogonal with respect to said central hole, and four forks respectively extending from four corners of said box in the equivalent a corresponding direction, said skewer being inserted through said central hole of said box of said fork set and then secured by a bolt to said box.

8. The multipurpose roaster as recited in claim 1, further comprising a grid engaged with said pair of sliding guides and a plurality of secondary skewers, wherein said grid has a hanger for hanging said plurality of secondary skewers therefrom, each of said secondary skewers being formed with a ring for use in handling said secondary skewers.

* * * * *